J. P. SUMMERS.
Sawing-Machines.

No. 133,497.  Patented Nov. 26, 1872.

Witnesses:

Inventor.
Jno. P. Summers
per Alexander Mason
Attorneys.

UNITED STATES PATENT OFFICE.

JOHN P. SUMMERS, OF TIFFIN, OHIO.

IMPROVEMENT IN SAWING-MACHINES.

Specification forming part of Letters Patent No. 133,497, dated November 26, 1872.

*To all whom it may concern:*

Be it known that I, JOHN P. SUMMERS, of Tiffin, in the county of Seneca and in the State of Ohio, have invented certain new and useful Improvements in Sawing-Machines; and do hereby declare that the following is a full, clear, and exact description thereof, reference being had to the accompanying drawing and to the letters of reference marked thereon making a part of this specification.

The nature of my invention consists in the construction and arrangement of a sawing-machine, as will be hereinafter more fully set forth.

In order to enable others skilled in the art to which my invention appertains to make and use the same, I will now proceed to describe its construction and operation, referring to the annexed drawing, in which—

Figure 1:
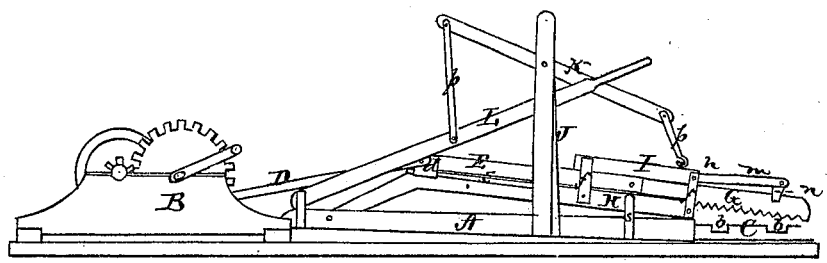
Figure 2:
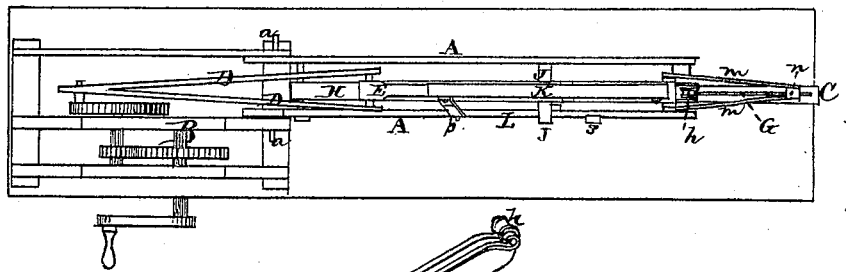
Figure 3:
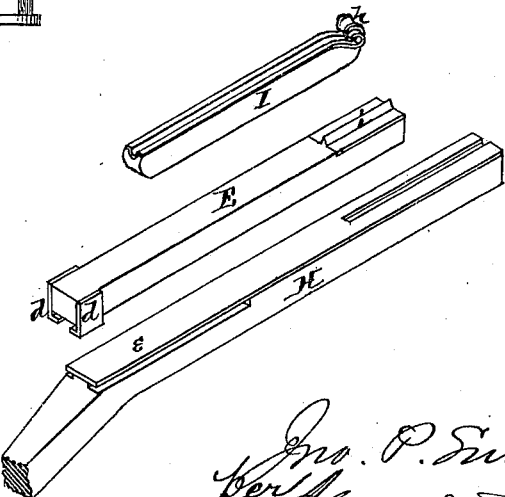

Figure 1 is a side elevation, and Fig. 2 a plan view, of my machine. Fig. 3 represents the saw and saw-arms detached.

A represents the parallel sills of the machine-frame, which sills are fastened by pins or bolts *a a* to the frame of a suitable power, B, for running the machine. By this means the entire sawing-machine may be readily detached from the power for transportation, and the motive power may be used for other purposes when the sawing-machine is not in use. From the other ends of the sills A A extends a tongue-piece, C, which runs under the saw, and is in its upper side provided with notches *b b*. In these notches it is intended that the log-carriage should traverse, whereby the machine can be worked perfectly steady—in fact it may be worked without the necessity of staking into the ground. From a wrist-pin on the fly-wheel of the power B a forked pitman, D, extends to and connects with the bar E, to the other end of which the saw G is attached. By means of the forked pitman the strain on the saw is uniform on both sides, while in the usual sawing-machines the strain is generally unequal, making the saw work harder. At the rear end of the bar E, on each side, is a plate, *d*, the lower edge of which is bent inward into a groove formed by a metal plate, *e*, secured on the upper side of the lower saw-arm H, thus holding the bar E to said arm while the bar and saw move back and forth. The saw-arm H is constructed in the bent shape shown in Figs. 1 and 3, its rear end being pivoted between the sills A A, as shown. The front end of this arm extends clear up to the log-carriage, and its upper side is grooved longitudinally, in which groove the saw G moves back and forth. The saw is by this means guided and made safe by being held in line right up to the log. Above the saw is a bar or arm, I, attached to the arm H by means of metal straps *f f*. The bar I is grooved on its under side, and in this groove moves a V-shaped or other suitable rib, *i*, on the upper side, at the front end of the bar E. The saw is thus kept perfectly steady, without any lateral vibration, between the arms H and I. At the front end of the arm I is arranged a grooved pressure-roller, *h*, which fits over the back edge of the saw and holds the same down to its work. From this end of the arm extend also two bars, *m m*, the front ends of which are attached to a forked guide, *n*, which straddles the back of the saw and keeps the outer end of the same from vibrating or moving out of its proper direction. The lower saw-arm H passes and is held between two upright posts, J J, attached to the sills A A and connected at their upper ends. One of these posts extends a short distance above the other, and has a lever, K, pivoted to it. The front end of this lever is, by a bar or link, *p*, connected with the front end of the upper saw-arm I, while the rear end of said lever is, by a similar bar, connected with a lever, L, pivoted to an ear or projection on one of the sills. By this system of levers the saw may be raised up or lowered at will, and when lowered pressure is exerted on the same. *s* is a catch to hold the lever L when the saw is raised.

Having thus fully described my invention, what I claim as new, and desire to secure by Letters Patent, is—

1. The saw-arm H, constructed as described, with plates *e* and grooved longitudinally on its upper side to form the lower guide for the saw, substantially as herein set forth.

2. The bar I, placed above the saw, connected with the saw-arm H by straps $ff$ and grooved longitudinally on its under side to form the upper guide for the saw, substantially as herein set forth.

3. The combination of the grooved saw-arm H, grooved bar I, bar E, saw G, and grooved pressure-roller $h$, all constructed and arranged substantially as and for the purposes herein set forth.

In testimony that I claim the foregoing I have hereunto set my hand this 16th day of July, 1872.

JOHN P. SUMMERS.

Witnesses:
   A. H. BYERS,
   ALEXANDER PEW.